(12) United States Patent
Wietelmann et al.

(10) Patent No.: US 9,496,545 B2
(45) Date of Patent: Nov. 15, 2016

(54) LI$_2$S@C-COATED LITHIUM METAL PRODUCT, METHOD FOR THE PRODUCTION THEREOF, AND USE

(71) Applicant: Rockwood Lithium GmbH, Frankfurt a. M. (DE)

(72) Inventors: Ulrich Wietelmann, Friedrichsdorf (DE);
(Continued)

(73) Assignee: Rockwood Lithium GmbH (DE)

( * ) Notice: Subject to any disclaimer, the term of this patent is extended or adjusted under 35 U.S.C. 154(b) by 225 days.

(21) Appl. No.: 14/356,640

(22) PCT Filed: Nov. 9, 2012

(86) PCT No.: PCT/EP2012/072234
§ 371 (c)(1),
(2) Date: May 7, 2014

(87) PCT Pub. No.: WO2013/068523
PCT Pub. Date: May 16, 2013

(65) Prior Publication Data
US 2014/0322612 A1    Oct. 30, 2014

(30) Foreign Application Priority Data
Nov. 9, 2011  (DE) .................. 10 2011 086 035

(51) Int. Cl.
*H01M 4/04* (2006.01)
*H01M 4/36* (2006.01)
(Continued)

(52) U.S. Cl.
CPC .............. *H01M 4/049* (2013.01); *C01D 15/06* (2013.01); *C23C 22/02* (2013.01); *H01M 4/366* (2013.01);
(Continued)

(58) Field of Classification Search
CPC ..................... H01M 4/5815; H01M 4/366
(Continued)

(56) References Cited

U.S. PATENT DOCUMENTS

2011/0171537 A1*  7/2011  Takeuchi ............... C01B 17/22
                                                       429/322
2012/0196186 A1   8/2012  Richard
(Continued)

FOREIGN PATENT DOCUMENTS

| WO | 2012/106102 A1 | 8/2012 |
| WO | 2012/171888 A2 | 12/2012 |
| WO | 2012/171889 A1 | 12/2012 |

OTHER PUBLICATIONS

Hassoun, et al. "A High-Performance Polymer Tin Lithium Ion Battery", Angew. Chem., 122 (2010), pp. 2421-2424.
(Continued)

Primary Examiner — James Lee
(74) Attorney, Agent, or Firm — Jeremy J. Kliebert

(57) ABSTRACT

A particulate lithium metal/lithium sulfide composite material, to a method for producing a Li$_2$S@C-coated lithium metal product, and to the use of said lithium metal product. The particulate lithium metal/lithium sulfide composite material has a core-shell morphology, the shell of which is made of a lithium sulfide containing C and the core of which is made of metal lithium. According to the method, the particulate lithium metal/lithium sulfide composite material is produced by reacting melted, drop-shaped lithium metal in a hydrocarbon solvent with a sulfur source selected from the group CS$_2$, S$_8$, H$_2$S, COS, SO, SO$_2$ or mixtures thereof. The method products according to the invention are used to produce lithium battery electrodes.

10 Claims, 8 Drawing Sheets

Figure 1:
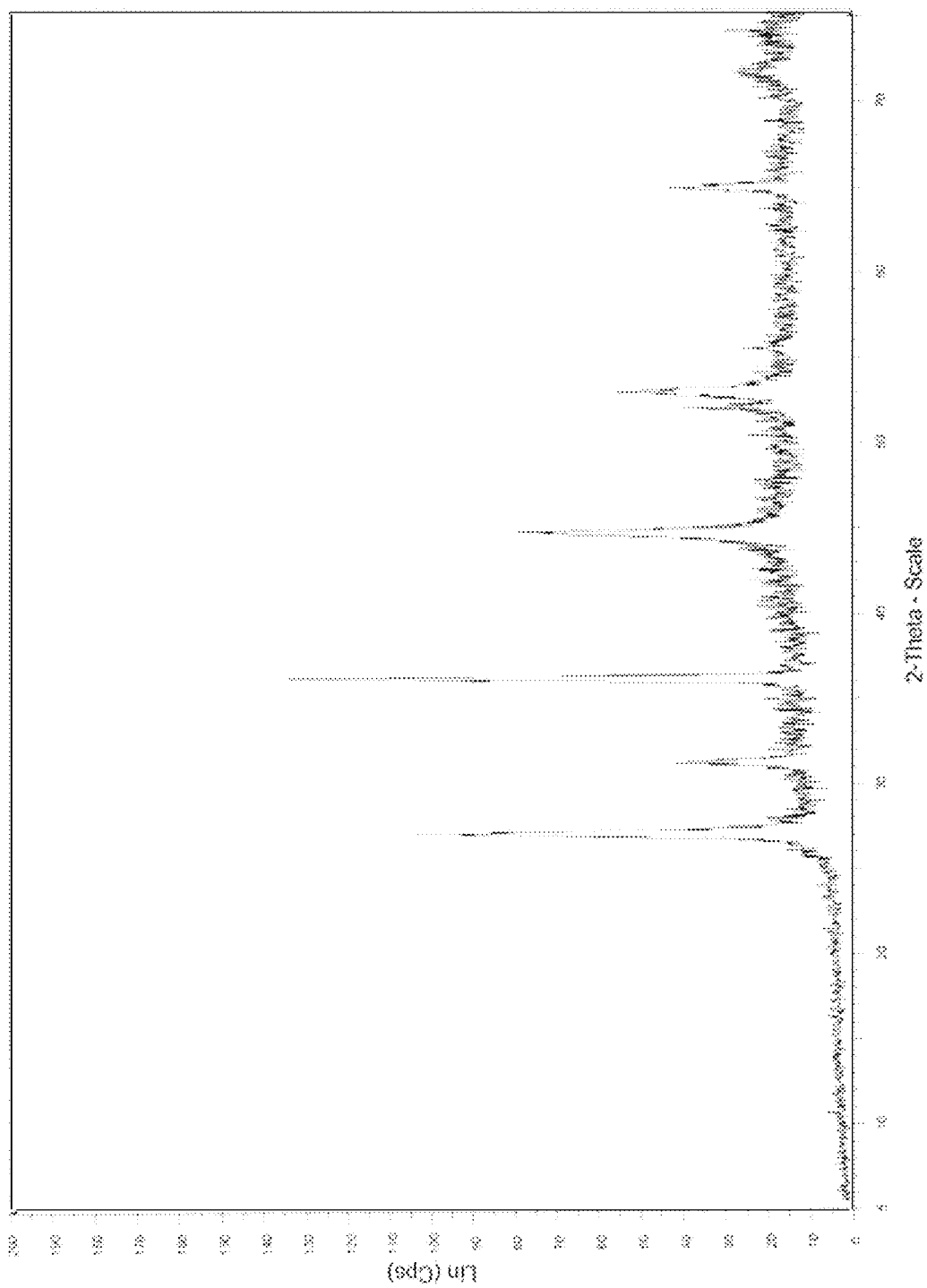

(72) Inventors: Ute Emmel, Frankfurt am Main (DE);
Christoph Hartnig, Eppstein (DE);
Sebastian Lang, Griesheim (DE)

(51) Int. Cl.
*H01M 4/62* (2006.01)
*H01M 10/52* (2006.01)
*H01M 4/40* (2006.01)
*H01M 4/58* (2010.01)
*C23C 22/02* (2006.01)
*C01D 15/06* (2006.01)
*H01M 4/02* (2006.01)

(52) U.S. Cl.
CPC ........... *H01M 4/405* (2013.01); *H01M 4/5815* (2013.01); *H01M 4/624* (2013.01); *H01M 4/628* (2013.01); *H01M 10/52* (2013.01); *H01M 2004/027* (2013.01)

(58) Field of Classification Search
USPC ................................................ 429/121–347
See application file for complete search history.

(56) References Cited

U.S. PATENT DOCUMENTS

| | | |
|---|---|---|
| 2014/0091776 A1 | 4/2014 | Matsuda et al. |
| 2014/0110635 A1 | 4/2014 | Witelmann |
| 2014/0124708 A1 | 5/2014 | Witelmann |

OTHER PUBLICATIONS

Jacoby, Mitch "Rechargeable Metal-Air Batteries", Chem. Eng. News, (2010), pp. 29-31.

Li, et al. "Electrochemical properties of the soluble reduction products in rechargeable Li/S battery", J. of Power Sources, 195 (2010), pp. 2945-2949.

Liang, et al. "Improved cycling performances of lithium sulfur batteries with LiNO3-modified electrolyte", J. of Power Sources, 196 (2011), pp. 9939-9843.

Pearson, et al. "The Polysulphides of the Alkali Metals. Part II. Lithium", (1931), XP-002686428, pp. 413-420.

\* cited by examiner

LI₂S@C-COATED LITHIUM METAL PRODUCT, METHOD FOR THE PRODUCTION THEREOF, AND USE

This application is a §371 of International Application No. PCT/EP2012/072234 filed Nov. 9, 2012, and claims priority from German Patent Application No. 10 2011 086 035.5 filed Nov. 9, 2011.

The invention relates to a particulate lithium metal/lithium sulfide composite material, a method for producing a Li₂S@C-coated lithium metal product, and use thereof.

Rechargeable electrochemical storage systems are presently becoming increasingly important in many areas of everyday life. In addition to the long-standing applications as automobile starter batteries and as an energy source for portable electronic devices, considerable growth is predicted in the future for electric automobile drives and for stationary energy storage. Traditional lead/sulfuric acid accumulators are not suitable for the new applications because their capacity is far too low, and they cannot be cycled frequently enough. In contrast, the best prospects are seen with lithium batteries.

However, lithium accumulators according to the prior art likewise have too little energy storage capacity for many applications. Present lithium-ion batteries have specific energy densities between approximately 100 and 250 Wh/kg. In addition, they usually contain costly elements such as cobalt and/or nickel. Lithium/sulfur and lithium/air systems have much higher (theoretical) energy densities:

| Battery system | Theoretical energy density | |
| --- | --- | --- |
|  | Wh/L | Wh/kg |
| Li ion (LiC₆/NMC) | 1710 | 510 |
| Lithium/sulfur | 2710 | 2450 |
| Lithium/air |  | 5830 |

The technical challenges in the development of Li/air systems are still so great that a marketable system is not expected for at least another 10-20 years (M. Jacoby, Chem. Eng. News, Nov. 22, 2010 29-31). The prospects for the lithium/sulfur system appear to be much more favorable. However, this battery has the disadvantage that it loses capacity too rapidly during charging and discharging. One reason for this is the high reactivity of lithium metal with organic materials such as common liquid electrolytes. These liquid electrolytes are solutions of lithium salts such as LiPF₆, lithium bis(trifluoromethylsulfonyl)imide (LiTFSI), or lithium bis(oxalato)borate (LiBOB) in organic solvents, carboxylic acid esters, ethers, or mixtures thereof. In addition, during the battery charging process, metallic lithium is generally not deposited from solutions homogeneously (in a planar form), but, rather, is deposited in a branch-like, i.e., dendritic, form having a large surface area. The dendrite formation represents primarily a safety problem, since in the extreme case the separator may be penetrated, possibly resulting in a short circuit. Furthermore, the dendrite formation may result in a drop in capacity of the galvanic cell: needle-shaped morphologies tend to break off from the bulk of the anode. Such metallic fragments which separate from the anode no longer have electronic contact with the anode, and therefore are no longer available as active material for the electrochemical charging/discharging reaction.

In addition, it is known that metallic lithium used as an anode is highly reactive with liquid electrolytes, so that a Li₂S layer forms on the anode as the result of decomposition of soluble lithium polysulfide. Due to the poor electronic and ionic conductivity of this layer, the impedance, i.e., the transfer resistance, increases, which is equivalent to a loss of power of the cell. Furthermore, the lithium is corroded to form a substance which no longer takes part in the redox process; i.e., the battery capacity correspondingly decreases. The drop in capacity may be reduced in the presence of lithium nitrate (Z. Wen, J. Power Sources 196 (2011) 9839-9843). However, it is disadvantageous that lithium nitrate, as an oxidizing agent, is reactive with the organic constituents of the electrolyte, so that once again safety problems may arise.

It has therefore been proposed to assemble the lithium/sulfur battery in the discharged state; i.e., a lithium-free (or low-lithium) material such as a tin/carbon composite is used as the anode, and lithium sulfide is used as the cathode (B. Scrosati, Angew. Chem. 2010, 122, 2421-2424). Unfortunately, this battery configuration has likewise proven to have insufficient cyclical stability. The main reason is that soluble oligosulfur compounds (Li₂S₃ and Li₂S₄, for example) may form during cycling. As a result, the cathode loses redox-active material (Y. Li, J. Power Sources 195 (2010) 2945-2949; D. Aurbach, J. Electrochem. Soc. 156 (8), A694-A702 (2009)).

The object of the invention is to provide a surface-stabilized anode material based on lithium metal, having a high specific surface, and which is less reactive and capable of being safely handled in standard facilities, and having a surface coating which is ionically and electronically conductive, the surface coating preferably containing no foreign elements (with regard to the particular battery chemistry), and a method for producing such a product in a simple, cost-effective manner.

The object is achieved by a particulate core/shell material made of a metal core and a shell made of a lithium metal/lithium sulfide composite material (Li₂S@C composite material). In addition, a method is provided which allows production of such a lithium metal having a high specific surface and having a passivating yet conductive casing.

The product according to the invention is preferably produced by reacting droplet-shaped molten lithium metal with a sulfur source selected from the group CS₂, S₈, H₂S, COS, SO, SO₂ in a hydrocarbon-based solvent and at temperatures of at least 180° C. to 300° C. maximum, preferably 180° C. to 250° C., particularly preferably 180° C. to 220° C. The stoichiometric ratio of lithium to sulfur is selected so that 50% by weight maximum, preferably 20% by weight, particularly preferably 5% by weight, of the lithium metal is converted to a lithium salt. In one very particularly preferred embodiment of the invention, the particulate lithium metal/lithium sulfide composite material according to the invention has a metallic lithium content of at least 97% by weight.

The production conditions are to be selected in such a way that initially uncoated lithium droplets having an average diameter of 300 μm, preferably 100 μm, particularly preferably 80 μm, result. According to the prior art, this is carried out by using a stirring element which introduces high shear forces, such as a dispersion disk (toothed disk mixer) or an atomizing mixer such as an Ultraturrax dispersing mixer. After lithium droplets having the desired particle diameter are formed, the reaction is carried out with a sulfur source according to the invention, resulting in formation of a passivating yet conductive surface layering.

After the passivating, conductive surface coating is formed, the stirring and homogenizing conditions are selected in such a way that the surface coating is not disrupted. This is achieved by using a less abrasive stirring process.

Instead of a high-energy stirrer, other dispersion processes corresponding to the prior art, for example ultrasonic atomization, may be used.

The solvent is preferably selected from the group of saturated hydrocarbons. It has surprisingly been found that when saturated hydrocarbons are used as the solvent, a surface coating in a pure phase which is coated or doped with noncrystalline ("X-ray amorphous") carbon composed primarily of lithium sulfide (referred to below as Li$_2$S@C) is obtained. In contrast, when aromatic or partially aromatic solvents are used, surface coatings containing lithium carbide or lithium hydride impurities often result. Solvents are preferably used which are liquid under the reaction conditions, i.e., which have boiling points of at least 180° C., more preferably at least 200° C., and particularly preferably boiling points >220° C. Examples include decane, undecane, dodecane, or any given mixtures of these compounds, whether they are linear, branched, or cyclic. Commercially available paraffin boiling fractions such as Shellsol® D70 or D100 are very particularly preferred.

The lithium metal used preferably has a purity of at least 98% by weight, and particularly preferably is used in battery quality. The sodium content is preferably less than 1000 ppm, particularly preferably less than 100 ppm.

Carbon disulfide and elemental sulfur (S$_8$) and/or H$_2$S are particularly preferred as the sulfur source. Carbon disulfide or a mixture of carbon disulfide and elemental sulfur is very particularly preferably used, the molar ratio of the two sulfur sources varying between 1:10 and 10:1, and the molar ratio of lithium to total sulfur (i.e., in the form of both sulfur sources) being 4:1, preferably 10:1, particularly preferably 40:1.

The product according to the invention, in comparison to the lithium foil customarily used, is characterized by a high specific surface due to the particulate morphology, which frequently is spherical, and particle sizes of preferably <500 µm. Preferred average particle sizes are between 1 and 500 µm, preferably between 10 and 100 µm, particularly preferably between 15 and 80 µm. In addition, the surface is fairly rough, not planar (smooth). Since the achievable current density of a galvanic cell is scaled to the specific surface of the electrode materials, among other factors, materials structured in this way are also suitable for achieving relatively high power, such as that necessary for automotive drive batteries, for example.

The carbon content of the Li$_2$S@C composite material according to the invention is between 0.1% and 50% by weight, preferably between 1% and 20% by weight. The carbon content may be varied by selecting the reaction conditions (primarily the temperature) and by selecting the sulfur source. Higher carbon contents are obtained in particular by using carbon-containing sulfur compounds, preferably carbon disulfide (CS$_2$) and/or carbonyl sulfide (COS). The reaction may proceed using only these compounds as the sulfur source according to

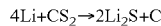

or

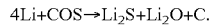

The lithium metal products according to the invention having a Li$_2$S@C shell are used for producing battery anodes, and are particularly preferably used for lithium-sulfur batteries.

The invention is explained in greater detail below with reference to two examples and eight figures.

Figure 2:
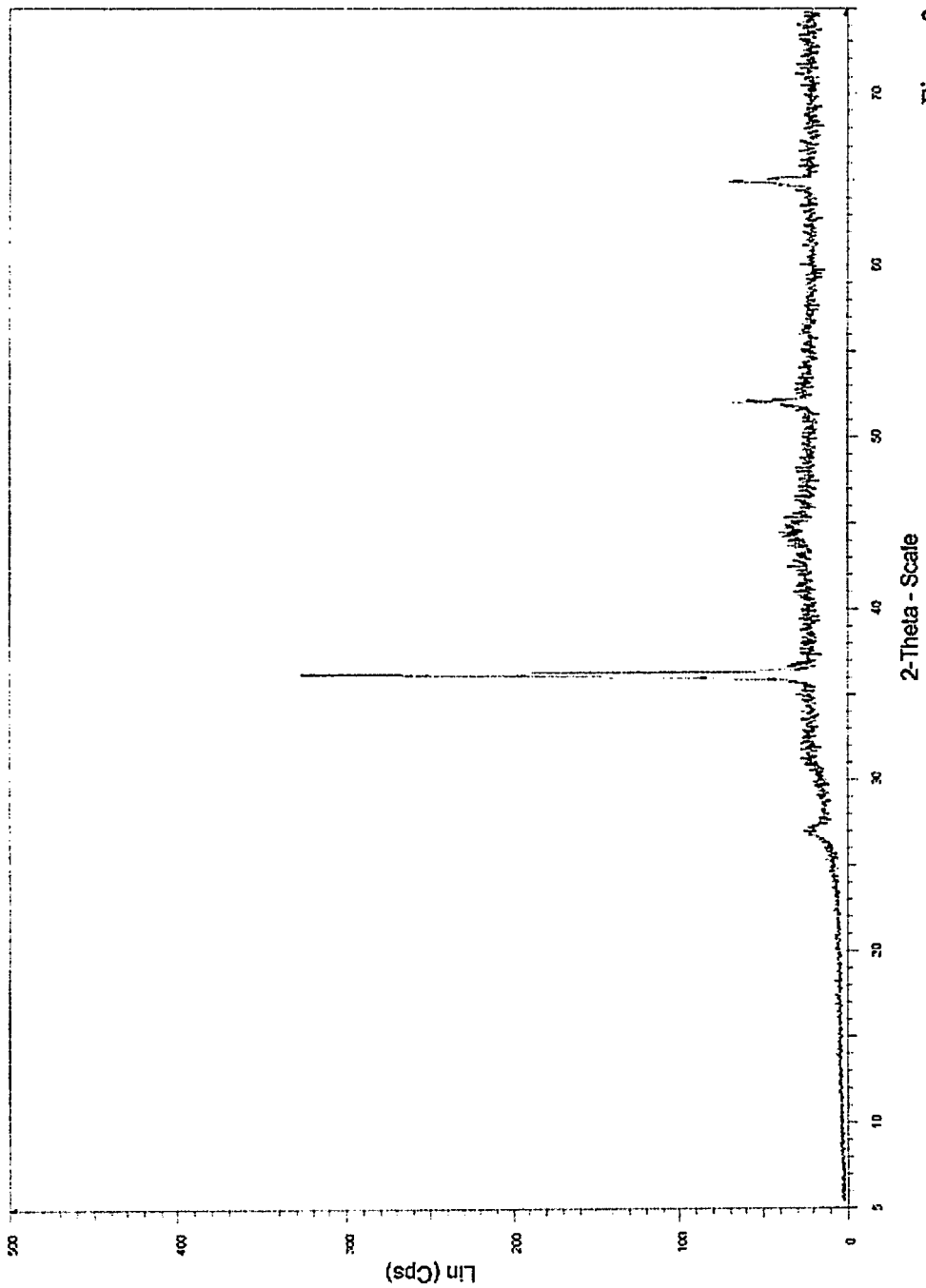
Figure 3:
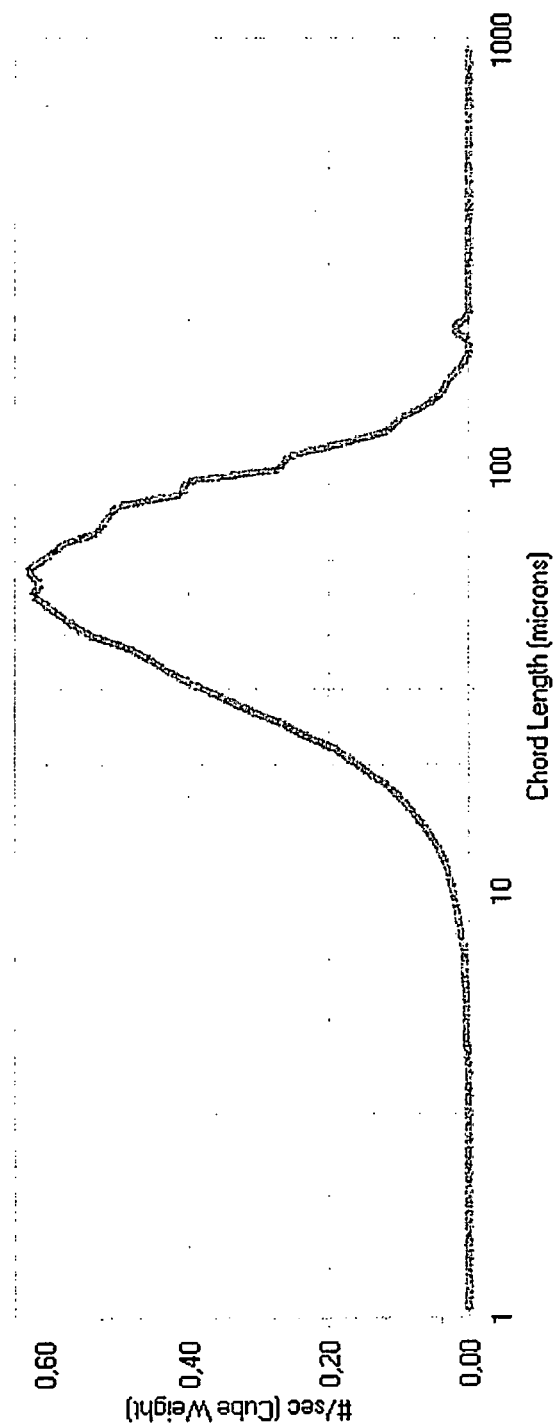
Figure 4:
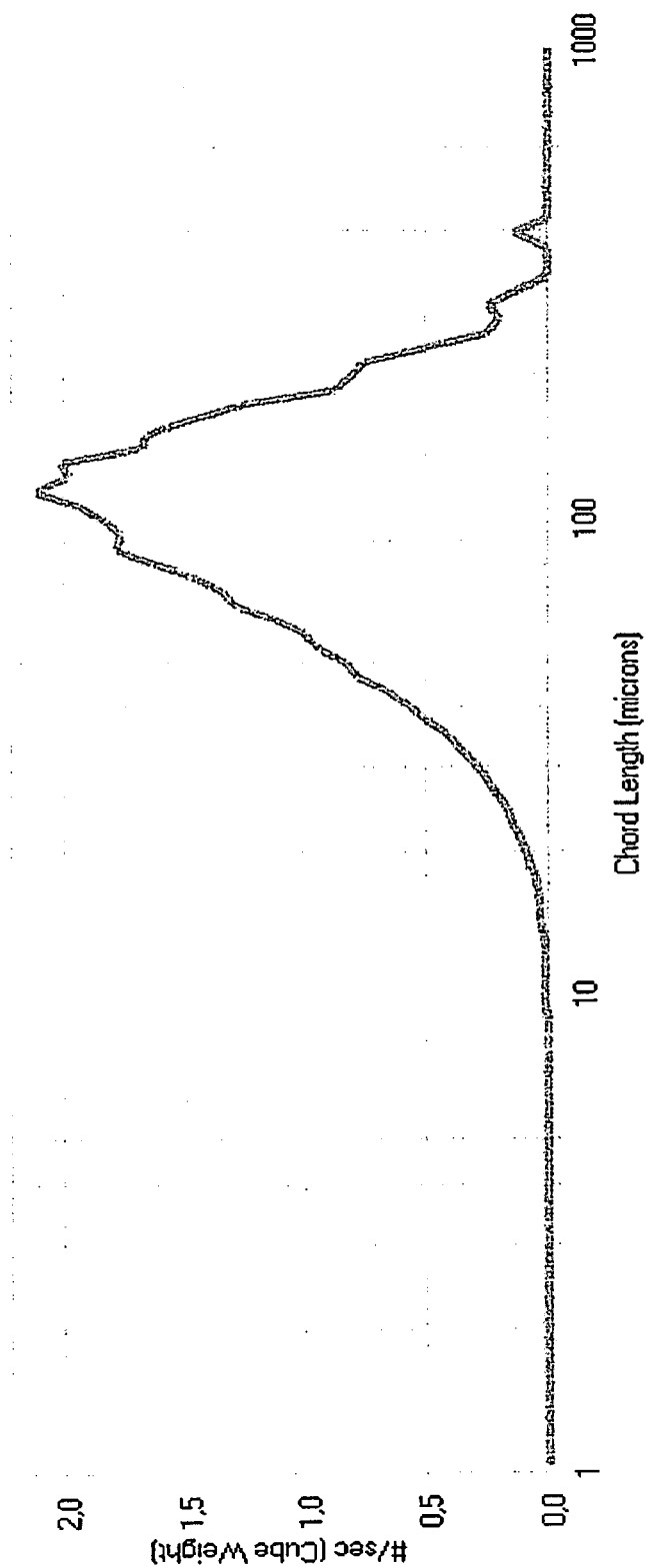
Figure 5:
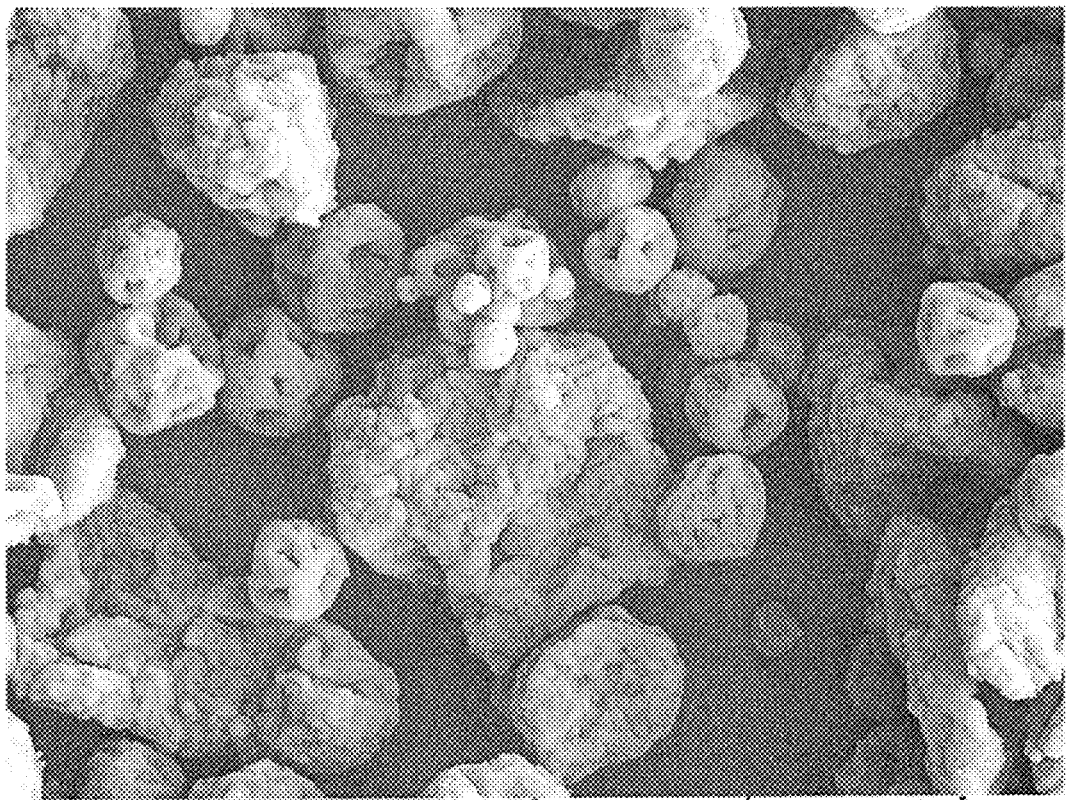
Figure 6:
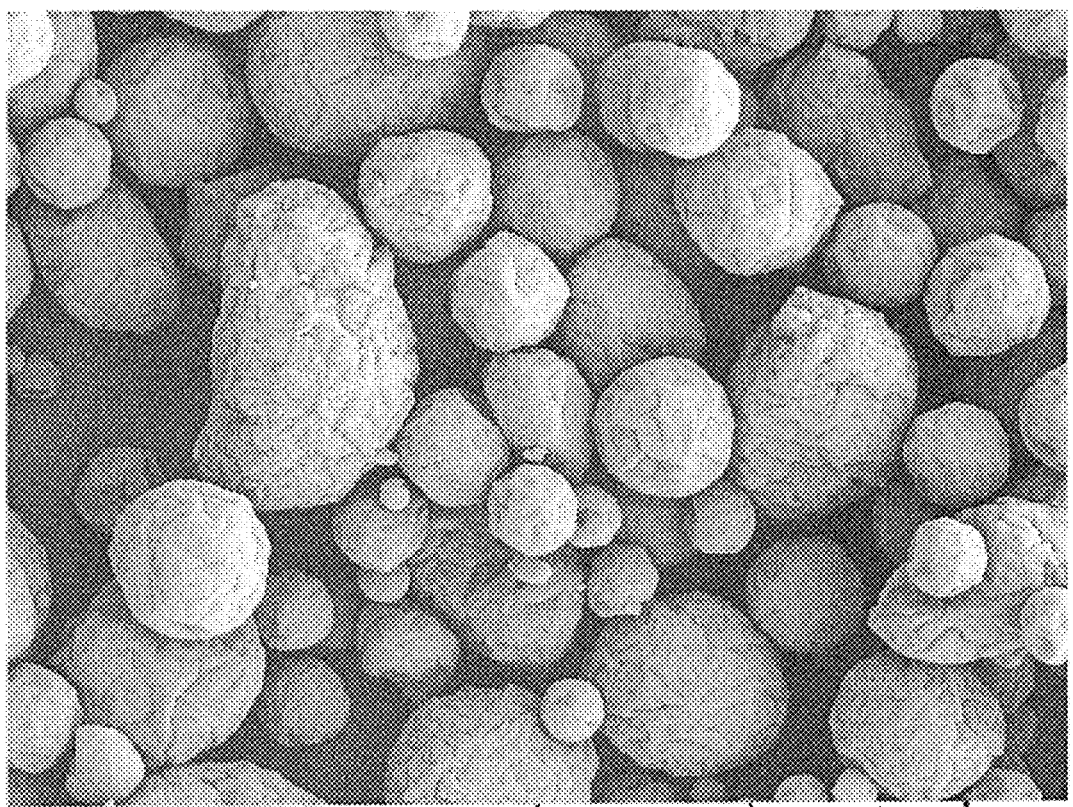
Figure 7:
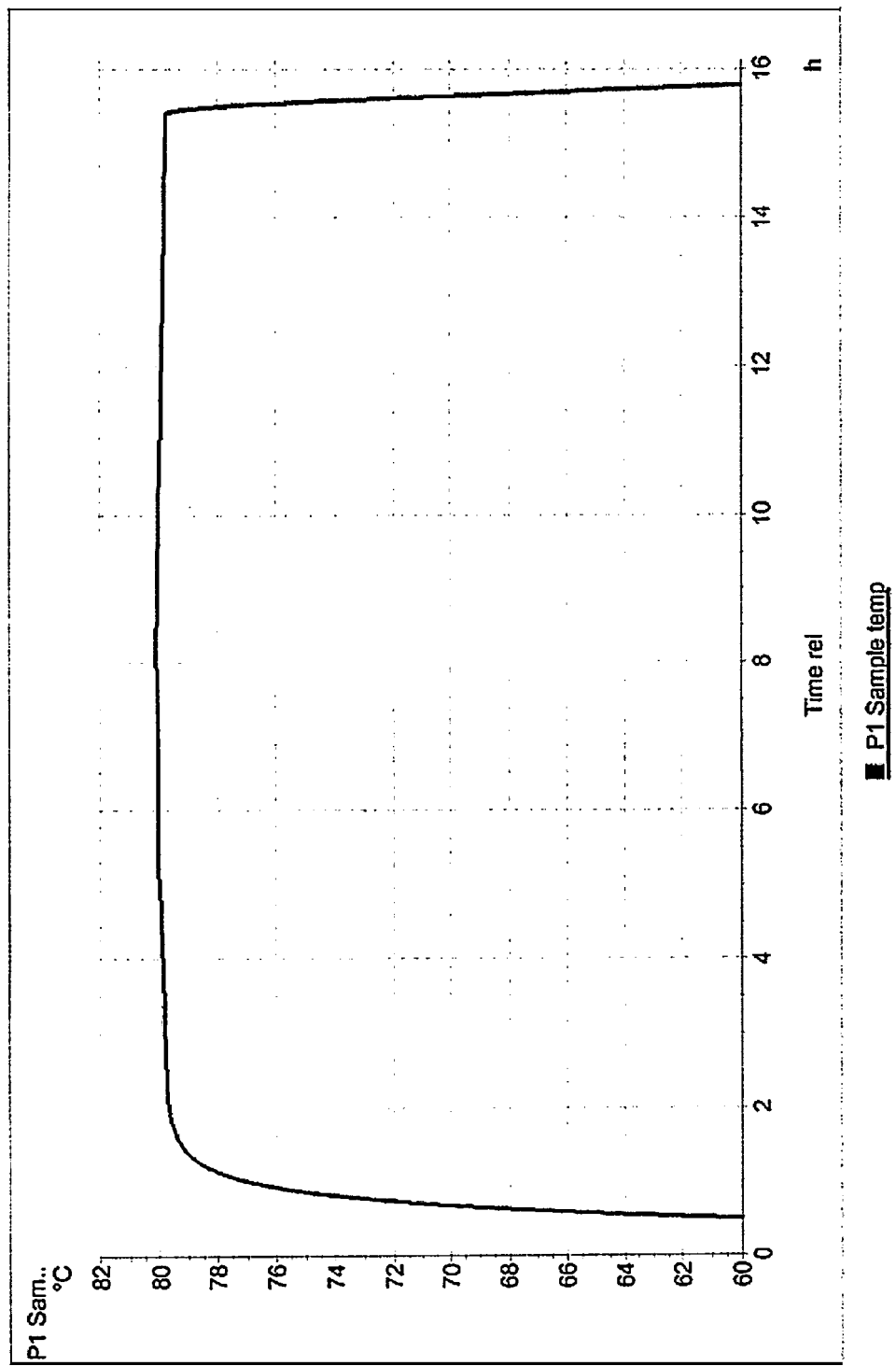
Figure 8:
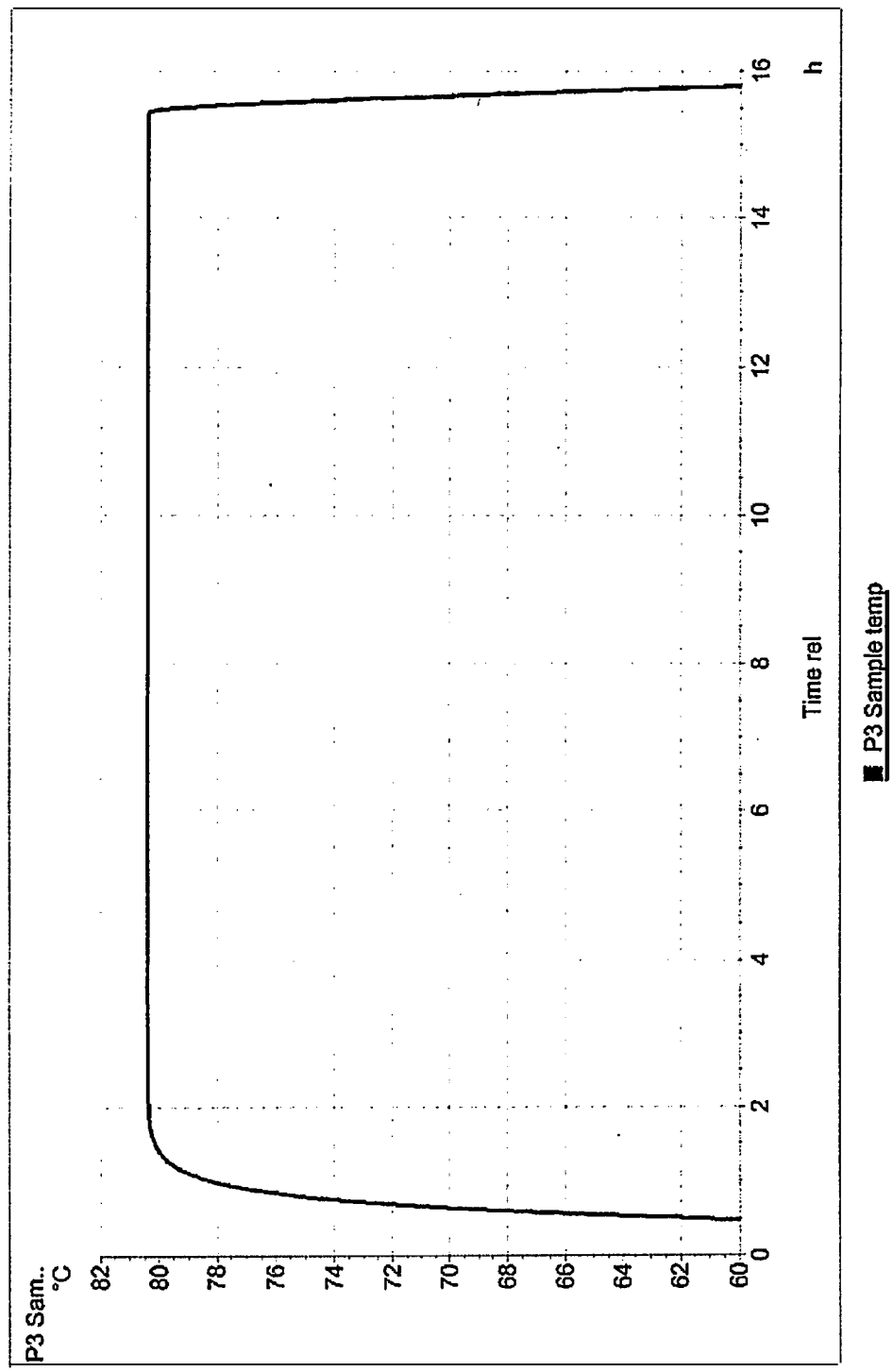

The figures show the following:

FIG. 1: shows an X-ray diffractogram of the product produced according to Example 1, the peak x being assigned to Li$_2$S, and the peak o being assigned to lithium metal;

FIG. 2: shows an X-ray diffractogram of the product produced according to Example 2, the peak x being assigned to Li$_2$S, and the peak o being assigned to lithium metal;

FIG. 3: shows the particle size distribution of the product produced according to Example 1, determined by laser scattered light measurement;

FIG. 4: shows the particle size distribution of the product produced according to Example 2, determined by laser scattered light measurement;

FIG. 5: shows a scanning electron microscope (SEM) image of the product produced according to Example 1;

FIG. 6: shows an SEM image of the product produced according to Example 2;

FIG. 7: shows the results of differential scanning calorimetry (DSC) of the product from Example 1; and FIG. 8: shows the results of DSC of the product from Example 2.

EXAMPLES

Example 1

Production of Li$_2$S@C-Coated Lithium from Molten Lithium Metal and 2.5 Mol-% CS$_2$ at 200° C. in Paraffin Oil 20.5 g lithium metal in 520 g Shellsol® D100 was placed in an inerted (i.e., free of water and air, filled with Ar) stainless steel double-shell reactor equipped with a high-energy stirring element (Ultraturrax), and was melted at a 210° C. shell temperature, with stirring. After melting was complete, the lithium was processed into a fine emulsion using the high-energy stirrer (several minutes at 16,000 rpm). A 20% solution of 5.48 g carbon disulfide in Shellsol® D100 was added through a reactor opening. The reaction was exothermic, as shown by a rise in the internal temperature from 197° C. to just under 200° C. After the addition was complete, the stirrer was turned off, and the mixture was then cooled to 8° C. and the suspension was pressed onto a filter frit using a Teflon immersion tube, washed (first with Shellsol®, then three times with pentane), and dried to a constant weight at room temperature (RT). 25.7 g of a dark gray, free-flowing powder was obtained.

The powder consisted of irregular ellipsoidal and spherical particles having pronounced surface fissures (see FIG. 5), and had a metal content of 79.6% by weight (gas volumetric determination by hydrolysis). The material had an average particle size of 55 µm. The carbon content was 3.4% by weight, corresponding to a projected shell proportion of 20.4% by weight of a shell concentration of 16.7% by weight.

Stability of the product according to the invention from Example 1 in N-methylpyrrolidone (NMP), DSC tests An apparatus from Systag, Switzerland (Radex system) was used for the differential scanning calorimetry (DSC) tests. 2 g N-methylpyrrolidone (NMP) and 0.1 g of the test product were weighed into the sample containers under a protective gas atmosphere. The samples were stored for 15 h at specified temperatures.

No thermal effects were observed (FIG. 7) when the material according to the invention was stored at 80° C.

Additional tests demonstrated that mixtures with NMP are stable up to approximately 110° C.

Example 2

Production of $Li_2S@C$-Coated Lithium from Molten Lithium Metal and 0.3 Mol-% $CS_2$ at 200° C. in Paraffin Oil 19.4 g lithium metal in 500 g Shellsol® D100 was placed in an inerted (i.e., free of water and air, filled with Ar) stainless steel double-shell reactor equipped with a high-energy stirring element (Ultraturrax), and was melted at a 210° C. shell temperature, with stirring. After melting was complete, the lithium was processed into a fine emulsion using the high-energy stirrer (several minutes at 16,000 rpm). A 20% solution of 0.64 g carbon disulfide in Shellsol® D100 was added through a reactor opening. The reaction was exothermic, as shown by a rise in the internal temperature from approximately 207° C. to just under 210° C. After the addition was complete, the stirrer was turned off, and the mixture was then cooled to 80° C. and the suspension was pressed onto a filter frit using a Teflon immersion tube, washed (first with Shellsol®, then three times with pentane), and dried to a constant weight at room temperature (RT). 19.8 g of a dark gray, free-flowing powder was obtained.

The powder consisted of predominantly spherical particles having moderate surface fissures (see FIG. 6), and had a metal content of 98.2% by weight (gas volumetric determination by hydrolysis). The carbon content was 0.23% by weight, corresponding to 13% by weight based on the proportion of particle shells.

The material had an average particle size of 107 μm (see FIG. 4).

Traces of lithium sulfide/lithium metal were identified as the primary crystalline phases by X-ray diffractometry (FIG. 2).

Stability of the Product According to the Invention from Example 2 in NMP DSC Tests No thermal effects were observed (FIG. 8) when the material according to the invention was stored at 80° C. Additional tests demonstrated that mixtures with NMP are stable up to approximately 120° C.

The invention relates to the following in particular:
Particulate lithium metal/lithium sulfide composite material having a core/shell morphology, the shell being made of a C-containing lithium sulfide, and the core being made of metallic lithium.
Composite material, wherein 50% by weight maximum, preferably 20% by weight maximum, particularly preferably 5% by weight maximum, of the contained lithium is present in nonmetallic form, i.e., predominantly as lithium sulfide.
Composite material, wherein the carbon content of the $Li_2S@C$ shell is between 0.1 and 50% by weight, preferably between 1 and 30% by weight.
Composite material, wherein the purity of the lithium metal used is at least 98% by weight.
Composite material, wherein the sodium content, based on the total lithium content, is 1000 ppm maximum, preferably 100 ppm maximum.
Composite material, wherein the size of the individual particles is not greater than 500 μm.
Composite material, wherein the average particle size is between 1 and 500 μm, preferably between 10 and 100 μm, particularly preferably between 15 and 80 μm.
Method for producing a particulate lithium metal/lithium sulfide composite material, wherein molten, droplet-shaped lithium metal in a hydrocarbon solvent is reacted with a sulfur source selected from the group $CS_2$, $S_8$, $H_2S$, COS, SO, $SO_2$, or mixtures thereof.
Method in which preferably pure carbon disulfide or a mixture of carbon disulfide and sulfur and/or hydrogen sulfide is used as the sulfur source.
Method in which the reaction is carried out at temperatures in the range of 180° C. to 300° C., preferably 180° C. to 250° C., particularly preferably 180° C. to 220° C.
Method in which preferably saturated solvents which are liquid under the selected reaction conditions, i.e., having boiling points of at least 180° C., preferably at least 200° C., particularly preferably boiling points >200° C., are used as the hydrocarbon solvent.
Method in which decane, undecane, dodecane, or any given mixtures of these named compounds, whether linear, branched, or cyclic, is/are preferably used as the hydrocarbon solvent.
Method in which commercially available paraffin boiling fractions such as Shellsol® D70 or D100 are particularly preferably used as the hydrocarbon solvent.
Use of the particulate lithium metal/lithium sulfide composite material for the production of lithium battery electrodes.
Use of the particulate lithium metal/lithium sulfide composite material for the production of anodes for lithium-sulfur batteries.

The invention claimed is:

1. A method for producing a particulate composite material comprising the steps of:
   reacting droplet-shaped molten lithium metal in a hydrocarbon solvent with at least one sulfur source to produce the particulate composite material, wherein the at least one sulfur source is selected from the group consisting of $CS_2$, $S_8$, $H_2S$, COS, SO, $SO_2$ and mixtures thereof;
   wherein the particulate composite material comprises a shell and a core, wherein the shell comprises a C-containing lithium sulfide, and wherein the core comprises metallic lithium.

2. A method according to claim 1, wherein the at least one sulfur source comprises at least one member selected from the group consisting of $CS_2$, $S_8$, $H_2S$, and mixtures thereof.

3. A method according to claim 1, wherein the reacting step is conducted at a temperature in the range of 180° C. to 300° C.

4. A method according to claim 1, wherein the hydrocarbon solvent is a saturated solvent which is liquid under reaction conditions.

5. A method according to claim 1, wherein the hydrocarbon solvent comprises at least one member selected from the group consisting of decane, undecane, dodecane, and any given mixtures thereof.

6. A method according to claim 1, wherein paraffin boiling fractions are used as the hydrocarbon solvent.

7. A method according to claim 1, wherein the reacting step is conducted at a temperature in the range of 180° C. to 250° C.

8. A method according to claim 1, wherein the reacting step is conducted at a temperature in the range of 180° C. to 220° C.

9. A method according to claim 1, wherein the hydrocarbon solvent has a boiling point of at least 180° C.

10. A method according to claim 1, wherein the hydrocarbon solvent has a boiling point of at least 200° C.

* * * * *